US009299107B2

(12) United States Patent
Streeter et al.

(10) Patent No.: US 9,299,107 B2
(45) Date of Patent: Mar. 29, 2016

(54) SYSTEM AND METHOD FOR MANAGING THE CHARGING AND DISCHARGING OF AN ENERGY STORAGE DEVICE

(71) Applicant: Convergent Energy + Power, New York, NY (US)

(72) Inventors: Christopher M. Streeter, New York, NY (US); Frank Genova, III, New York, NY (US); Johannes Rittershausen, New York, NY (US)

(73) Assignee: Convergent Energy + Power, New York, NY (US)

( * ) Notice: Subject to any disclaimer, the term of this patent is extended or adjusted under 35 U.S.C. 154(b) by 44 days.

(21) Appl. No.: 14/206,712

(22) Filed: Mar. 12, 2014

(65) Prior Publication Data
US 2014/0279361 A1  Sep. 18, 2014

Related U.S. Application Data

(60) Provisional application No. 61/778,813, filed on Mar. 13, 2013.

(51) Int. Cl.
*G06Q 40/00* (2012.01)
*G06Q 40/04* (2012.01)
*G06Q 50/06* (2012.01)

(52) U.S. Cl.
CPC .............. *G06Q 40/04* (2013.01); *G06Q 50/06* (2013.01)

(58) Field of Classification Search
CPC ....... G06Q 50/06; G06Q 40/04; G06Q 40/00; G06Q 40/06; G06Q 40/02; G06Q 40/025; H02J 7/0068; H02J 7/0013; H02J 7/0016; H02J 7/007
See application file for complete search history.

(56) References Cited

U.S. PATENT DOCUMENTS 6,925,361 B1 * 8/2005 Sinnock ............... G06N 3/0436
   700/286
7,085,739 B1 * 8/2006 Winter et al. .................. 705/37
(Continued)

FOREIGN PATENT DOCUMENTS

| WO | 2011028901 | 3/2011 | |
| WO | 2012038194 | 3/2012 | |
| WO | WO 2014/106105 | * 7/2014 | ............... H02J 3/28 |

OTHER PUBLICATIONS

Chen et al.: Progress in electrical energy storage system: A critical review, 2009, Progress in Natural Science 19, pp. 291-312.*
(Continued)

*Primary Examiner* — Bijendra K Shrestha
(74) *Attorney, Agent, or Firm* — Honigman Miller Schwartz and Cohn LLP; Andrew N. Weber; Jonathan P. O'Brien

(57) ABSTRACT

Techniques for managing the charging and/or discharging of an energy storage device are disclosed. The techniques include obtaining clearing price data points spanning a plurality of dates and for each date: generating a distribution of the clearing price data points corresponding to the date; determining a lower quantile price point of the distribution based on a capacity of the device and a charge rate of the device; and determining an upper quantile price point of the distribution based on the capacity and a discharge rate of the device. The techniques include selecting a first set of the lower quantile price points from the lower quantiles and a second set of the upper quantile price points from the upper quantiles. The techniques include determining a buy bid based on the first set and a sell bid based on the second set and selectively transmitting the buy bid and/or the sell bid.

24 Claims, 7 Drawing Sheets

(56) References Cited

U.S. PATENT DOCUMENTS

| | | | |
|---|---|---|---|
| 2002/0091626 A1* | 7/2002 | Johnson et al. | 705/37 |
| 2003/0041002 A1* | 2/2003 | Hao et al. | 705/37 |
| 2003/0216994 A1* | 11/2003 | Peljto et al. | 705/37 |
| 2004/0215529 A1* | 10/2004 | Foster et al. | 705/26 |
| 2008/0046387 A1 | 2/2008 | Gopal et al. | |
| 2008/0228518 A1 | 9/2008 | Braziel et al. | |
| 2008/0262857 A1 | 10/2008 | Perera | |
| 2013/0166428 A1* | 6/2013 | Hwang | G06Q 30/0283 705/37 |
| 2013/0178992 A1* | 7/2013 | De Graeve | 700/286 |

OTHER PUBLICATIONS

Himelic et al.: Sodium Sufur Battery Energy Storage and its Potential to Enable further Integration of Wind, Jul. 7, 2010, Xcel Energy, Data Collection and Analysis Report (Milestone 5), pp. 1-111.*

* cited by examiner

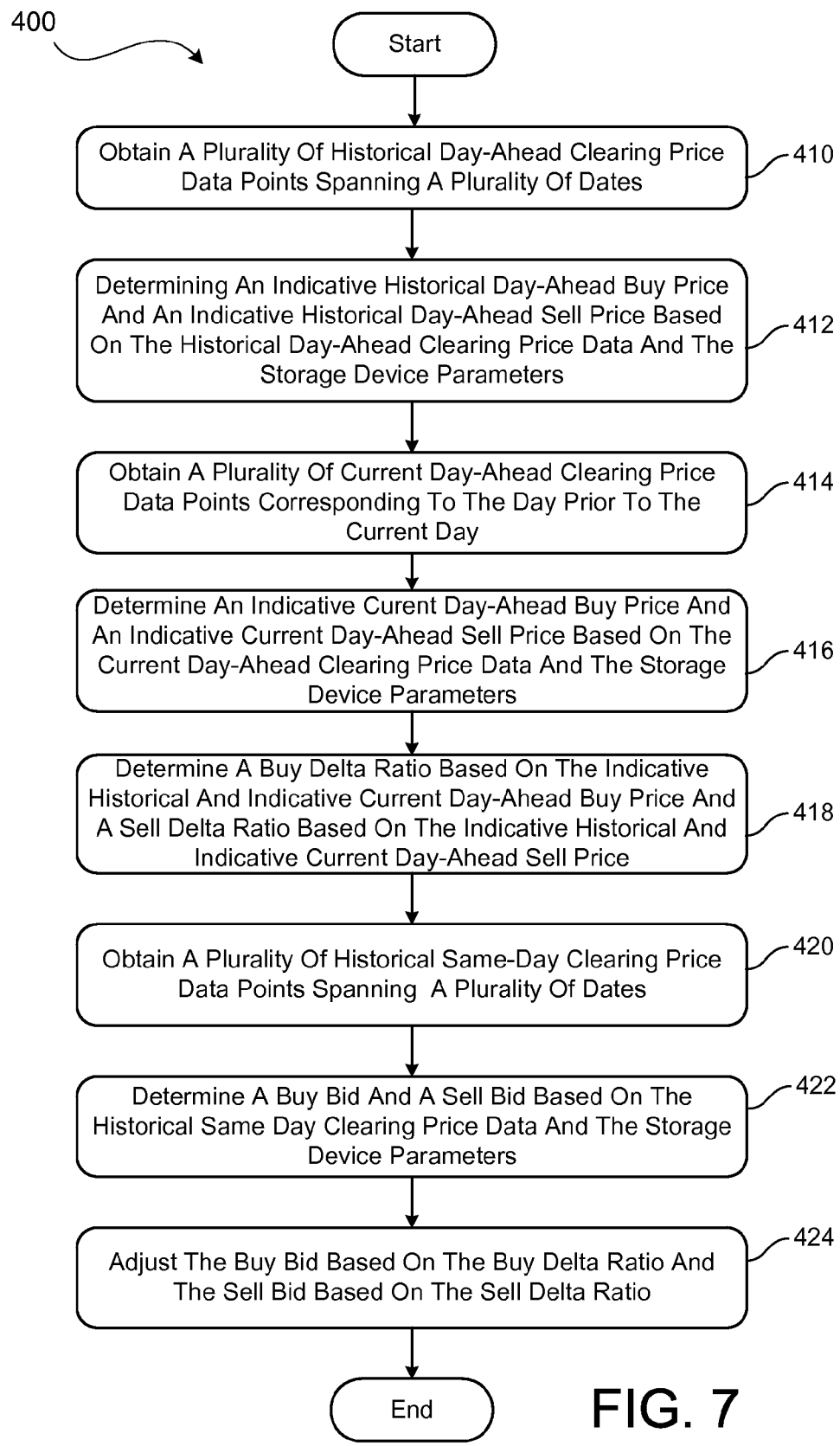

SYSTEM AND METHOD FOR MANAGING THE CHARGING AND DISCHARGING OF AN ENERGY STORAGE DEVICE

CROSS-REFERENCE TO RELATED APPLICATIONS

This application claims priority from U.S. Provisional Application No. 61/778,813, filed Mar. 13, 2013, the entire contents of which are incorporated by reference.

TECHNICAL FIELD

This disclosure relates to techniques for managing the charging and discharging of an energy storage device in an energy wholesale market.

BACKGROUND

Traditionally, energy is delivered to end-users from generation facilities via what is often referred to as the "grid." FIG. 1A illustrates an example of a traditional energy delivery system 10. Energy can be generated at a generation facility 12, e.g., coal power plants, nuclear power plants, hydroelectric power plants, wind farms and/or solar panels. The energy can be output in an alternating current (AC) or direct current (DC) to one or more transmission sites 14 at a high voltage. The transmission site 14 can "step-down" the voltage, if AC, or "step-down" the voltage and convert to AC, if DC, and can deliver the stepped-down AC to one or more sub-transmission facilities 16. The sub-transmission facility 16 can further step-down the AC and deliver the AC to one or more distribution sites 18. The distribution site 18 can further step down the AC and deliver the AC to one or more customer sites 20. At the customer sites 20, the AC can be used to power any number of devices.

In some circumstances, the generation 12, transmission 14, sub-transmission 16, and distribution 18 resources are all owned and operated by a single entity. In these cases, the supply of energy needed to meet the demand for any particular time at any particular location is determined internally by the owner/operator of the vertically-integrated system.

In many circumstances, however, the owners/operators of the generation 12, transmission 14, sub-transmission 16, and distribution 18 resources are separate entities. In this case, wholesale energy markets may be created to allow these distributed resource owners to successfully match energy supply and demand. In these wholesale energy markets, energy producers (e.g. generators) offer energy supply into an energy marketplace for the delivery of a specific quantity of energy at a specific point in time (either immediately or at some future time). Energy consumers (e.g. utilities), bid into this same market to meet their real-time or forecasted energy demands. These sell and buy bids are used to match energy supply and demand for a specific time at a specific location, resulting in a market clearing price for each unit of energy supplied into the electrical system during that time and at that location. In order to dispatch energy onto the grid, an energy supplier must place a sell bid that is at or below the market clearing price for energy. In order to take energy from the grid, an energy consumer must place a buy bid that is at or above the market clearing price for energy.

SUMMARY

One aspect of the disclosure provides techniques for managing the charging and/or discharging of an energy storage device. The techniques include obtaining a plurality of clearing price data points spanning a plurality of dates. Each clearing price data point is indicative of a clearing price of a unit of energy on a certain date. The techniques further include, for each date represented in the plurality of clearing data points, generating a distribution of the clearing price data points corresponding to the date. The techniques also include, for each date, determining a lower quantile price point of the distribution based on a capacity of the energy storage device and a charge rate of the energy storage device. The techniques further include determining an upper quantile price point of the distribution based on a capacity of the energy storage device and a discharge rate of the energy storage device. The techniques also include selecting a first set of the lower quantile price points from the determined lower quantiles and selecting a second set of the upper quantile price points from the determined upper quantiles. The techniques also include determining a buy bid indicating an offered price for a purchase of energy based on the first set and a sell bid indicating an offered price for a sale of energy based on the second set. When the buy bid is accepted, purchased energy is used to charge the energy storage device at a prescribed time and when the sell bid is accepted, sold energy is discharged from the energy storage device at a second prescribed time.

Implementations of the disclosure may include one or more of the following features. In some implementations, the techniques include determining whether to transmit the buy bid to an energy market server base on the current capacity of the energy storage devices, as well as any additional operating constraints. In some examples, the techniques include transmitting the buy bid to an energy market server when the current capacity of the energy storage device is less than or equal to a maximum threshold. The techniques may include determining whether to transmit the sell bid to an energy market server based on a current capacity of the energy storage device. The energy market server may be associated with an energy wholesale market that determines clearing prices for energy. Additionally or alternatively, the techniques may further include transmitting the sell bid to the energy market server when the current capacity of the energy storage device is greater than a minimum threshold.

In some examples, each clearing data point is a day-ahead clearing price indicating a day-ahead clearing price of energy on a corresponding date and the buy bid and sell bid are each day-ahead bids. Additionally, each clearing price data point may be a same-day clearing price indicating a same-day clearing price of energy on a corresponding date, and the buy bid and sell bid are each same-day bids.

In some implementations, selecting the first set of lower quantile price points may include, for each lower quantile price point, determining a type of day to which the lower quantile price point corresponds and grouping the lower quantile price points into a specific group based on the type of day. The first set of quantile price points may include lower quantile price points corresponding to the same type of day. The buy bid may be determined by averaging the lower quantile price points of the first set. Determining the lower quantile price points of a distribution may include determining a lower quantile index based on the charge rate of the energy storage device, the total capacity of the energy storage device, and an amount of time divisions in a day. Each time division may represent an equal period during the day when energy is provided to a purchaser of energy.

In some implementations, selecting the second set of upper quantile price points may include, for each upper quantile price point, determining a type of day to which the upper quantile price point corresponds and grouping the upper quantile price points into a specific group based on the type of day. The second set may include upper quantile price points corresponding to the same type of day. The sell bid may be determined by averaging the upper quantile price points of the second set. Determining the upper quantile price point of a distribution may include determining an upper quantile index based on the discharge rate of the energy storage device, the total capacity of the energy storage device, and an amount of time divisions in a day. Each time division may represent an equal period during the day when energy is sold.

Another aspect of the disclosure provides techniques for managing the discharging and/or charging of an energy storage device. The techniques include obtaining a plurality of historical day-ahead clearing price data points spanning a plurality of dates, each historical day-ahead clearing price data point being indicative of a day-ahead clearing price of energy for a specific date at a specific time. The techniques further include obtaining storage device parameters of the energy storage device including a charge rate of the energy storage device, a charge efficiency of the energy storage device, a discharge rate of the energy storage device, a discharge efficiency of the energy storage device, and a total capacity of the energy storage device. The techniques also include determining an indicative historical day-ahead buy price based on the plurality of historical day-ahead clearing price data points, the charge rate, and the total capacity. Additionally, the techniques include determining an indicative historical day-ahead sell price based on the plurality of historical day-ahead clearing price data points, the discharge rate, and the total capacity. The techniques also include obtaining a plurality of current day-ahead clearing price data points, each current day-ahead clearing price data point being indicative of a day-ahead clearing price of energy that is to be provided on a current date. The techniques also include determining an indicative current day-ahead buy price based on the plurality of current day-ahead clearing price data points, the charge rate and the total capacity. The techniques further include determining an indicative current day-ahead sell price based on the plurality of current day-ahead clearing price data points, the discharge rate, and the total capacity. The techniques also include determining a buy delta ratio based on the indicative historical day-ahead buy price and the indicative current day-ahead buy price. The techniques further include determining a sell delta ratio based on the indicative historical day-ahead sell price and the indicative current day-ahead sell price. The techniques additionally include obtaining a plurality of historical same-day clearing price data points spanning a plurality of dates, each historical same-day clearing price data point being indicative of a same-day clearing price of energy for a specific date. The techniques also include determining a buy bid indicating an offered price for a same-day purchase of a unit of energy based on the plurality of historical same-day clearing price data points, the charge rate, and the total capacity. The techniques further include determining a sell bid indicating an offered price for a same-day sale of a unit of energy based on the plurality of historical same-day clearing price data points, the discharge rate, and the total capacity. The techniques also include adjusting the buy bid based on the buy delta ratio; and adjusting the sell bid based on the sell delta ratio.

The indicative historical day-ahead buy price may be indicative of a price at which energy is profitably purchased during a period spanning the plurality of dates and the indicative historical day-ahead sell price may be indicative of a price at which energy is profitably sold during the period spanning the plurality of dates. The indicative current day-ahead buy price may be indicative of a price at which energy that is to be delivered on the current day was profitably purchased and the indicative current day-ahead sell price may be indicative of a price at which energy that is to be delivered on the current day was profitably sold.

Determining the indicative historical day-ahead buy price and the indicative historical day-ahead sell price may include, for each date represented in the plurality of historical day-ahead clearing price data points, generating a distribution of the historical day-ahead clearing price data corresponding to the date. The technique may further include determining a lower quantile price point of the distribution based on the total capacity and the charge rate and determining an upper quantile price point of the day-ahead distribution based on the total capacity and the discharge rate. The techniques may further include selecting a first set of the lower quantile price points and determining the indicative historical day-ahead buy price based on the first set. The techniques may also include selecting a second set of the upper quantile price points and determining the indicative historical day-ahead sell price based on the second set. Further, the techniques may include determining an indicative historical day-ahead buy price based on the day-ahead lower quantile price points and determining a day-ahead sale price based on the day-ahead upper quantile price points.

In some implementations, selecting the first set of lower quantile price points and the second set of upper quantile price points may include, for each lower quantile price point, determining a type of day to which the lower quantile price point corresponds and grouping the lower quantile price point into a specific group based on the type of day. The first set may include lower quantile price points corresponding to the same type of day. The indicative historical day-ahead price may be determined by averaging the lower quantile price points of the first set.

In some implementations, selecting the second set of upper quantile price points includes, for each upper quantile price point, determining a type of day to which the upper quantile price point corresponds and grouping the upper quantile price point into a specific group based on the type of day. The second set may include upper quantile price points corresponding to the same type of day. The indicative historical day-ahead sell price may be determined by averaging the upper quantile price points of the second set.

Determining the buy bid and the sell bid may include, for each date represented in the plurality of historical same-day clearing price data points, generating a distribution of the historical same-day clearing price data corresponding to the date, determining a lower quantile price point of the distribution based on the total capacity and the charge rate and determining an upper quantile price point of the distribution based on the total capacity and the discharge rate. The techniques further include selecting a first set of the lower quantile price points from the determined lower quantile price points, determining the buy bid based on the first set, selecting a second set of the upper quantile price points from the determined upper quantile price points and determining the sell bid based on the second set.

Selecting the first set of lower quantile price points and the second set of upper quantile price points includes, for each lower quantile price point, determining a type of day to which the lower quantile price point corresponds and grouping the lower quantile price point into a specific group based on the type of day. The first set may include lower quantile price points corresponding to the same type of day. The buy bid may be determined by averaging the lower quantile price points of the first set.

Selecting the second set of upper quantile price points may include, for each upper quantile price point, determining a type of day to which the upper quantile price point corresponds and grouping the upper quantile price point into a specific group based on the type of day. The second set may include upper quantile price points corresponding to the same type of day. The sell bid may be determined by averaging the upper quantile price points of the second set.

Determining the indicative current day-ahead buy price and the indicative current day-ahead sell price may include generating a distribution of the current day-ahead clearing price data corresponding to the date. The techniques may further include determining a lower quantile price point of the distribution based on the total capacity and the charge rate and determining an upper quantile price point of the day-ahead distribution based on the total capacity and the discharge rate. The indicative day-ahead buy price may be equal to the lower quantile price point of the distribution and the indicative current day-ahead sell price may be equal to the upper quantile price point of the distribution. Adjusting the buy bid may include multiplying the buy bid by the buy delta ration and adjusting the sell bid may include multiplying the sell bid by the sell delta ration.

In some examples, the techniques further include determining whether to transmit the adjusted buy bid to an energy market server based on a current capacity of the energy storage device. The energy market server may be associated with an energy wholesale market that determines clearing prices for energy. The techniques may further include transmitting the adjusted buy bid to the energy market server when the current capacity of the energy storage device is less than or equal to a maximum threshold.

In some implementations, the techniques include determining whether to transmit the adjusted sell bid to an energy market server based on a current capacity of the energy storage device. The energy market server may be associated with an energy wholesale market that determines clearing prices for energy. The techniques may further include transmitting the adjusted sell bid to the energy market server when the current capacity of the energy storage device is greater than a minimum threshold.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7 is a flow diagram illustrating an example set of operations for a method for determining buy and sell bids.

Like reference symbols in the various drawings indicate like elements.

DETAILED DESCRIPTION

Figure 1:
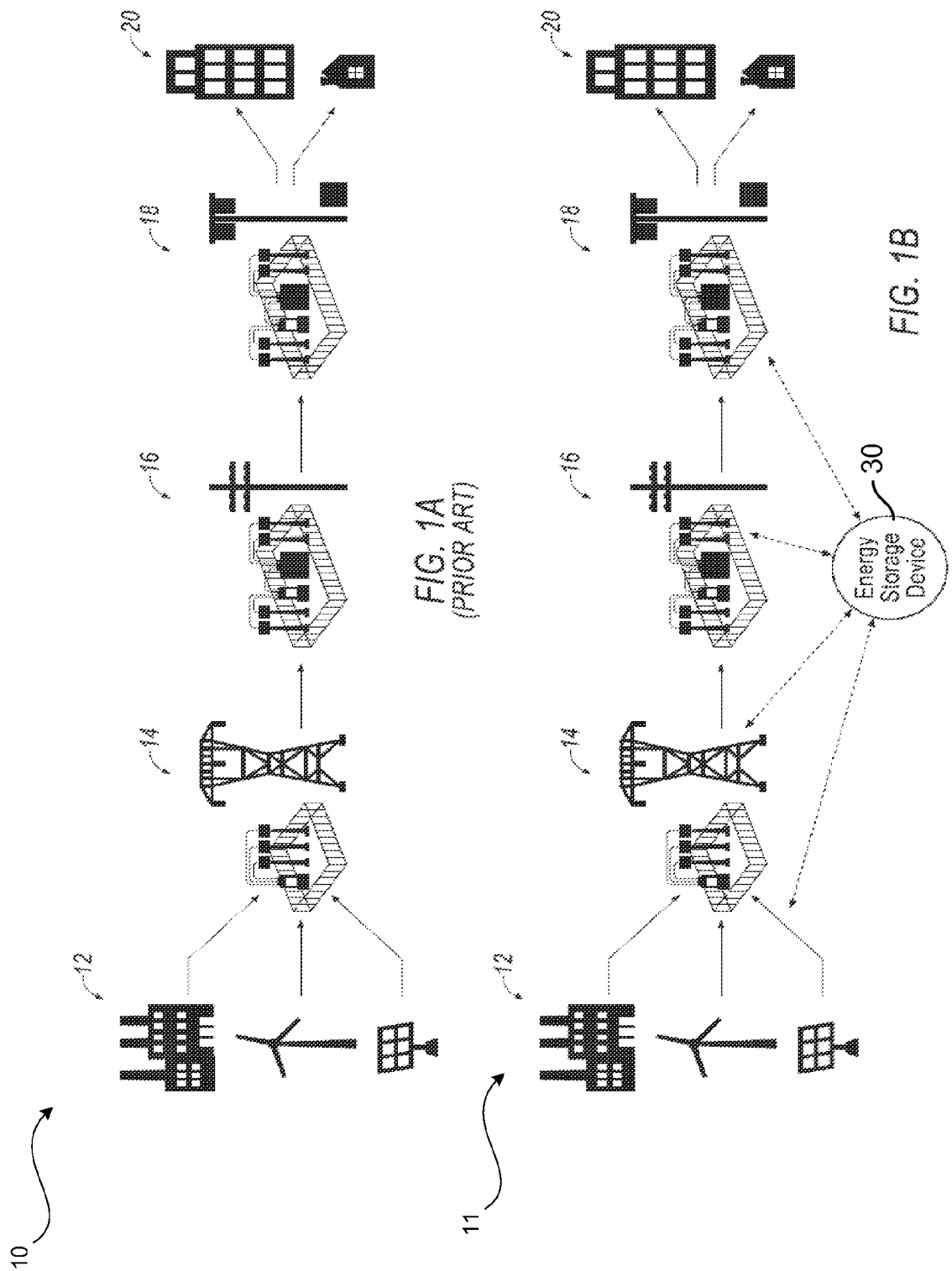
FIG. 1A is a drawing illustrating a traditional energy delivery system.
FIG. 1B is a drawing illustrating an energy delivery system.

FIG. 1B illustrates an example energy delivery system 11 for delivering energy in a wholesale energy market system. In the illustrated example, one or more energy storage devices 30 can be connected to the "grid." For example, an energy storage device 30 can be connected to a generation facility 12, a transmission site 14, a sub-transmission site 16, and/or a distribution site 18. As used herein, the term "energy storage device" can refer to any device configured to store a suitable amount of energy and configured to receive instructions to operate in a "charge mode," a "discharge mode," and an "idle mode." In some implementations, the energy storage device 30 receives the instructions from a remote server, e.g., a server associated with the wholesale energy market. In a charge mode, the energy storage device 30 receives and stores energy from the grid. In a discharge mode, the energy storage device 30 outputs previously stored energy back into the grid. In an idle mode, the energy storage device 30 neither receives energy from nor outputs energy to the grid. As will be discussed in further detail below, the operation of the energy storage device 30 is dependent on whether the asset owner has successfully purchased or sold energy on the energy wholesale market. When the asset owner successfully purchases energy from the energy wholesale market, the energy storage device 30 operates in the charge mode during a prescribed time period. When the asset owner successfully sells energy to the wholesale energy market, the energy storage device 30 operates in a discharge mode during a prescribed time period.

Figure 2:
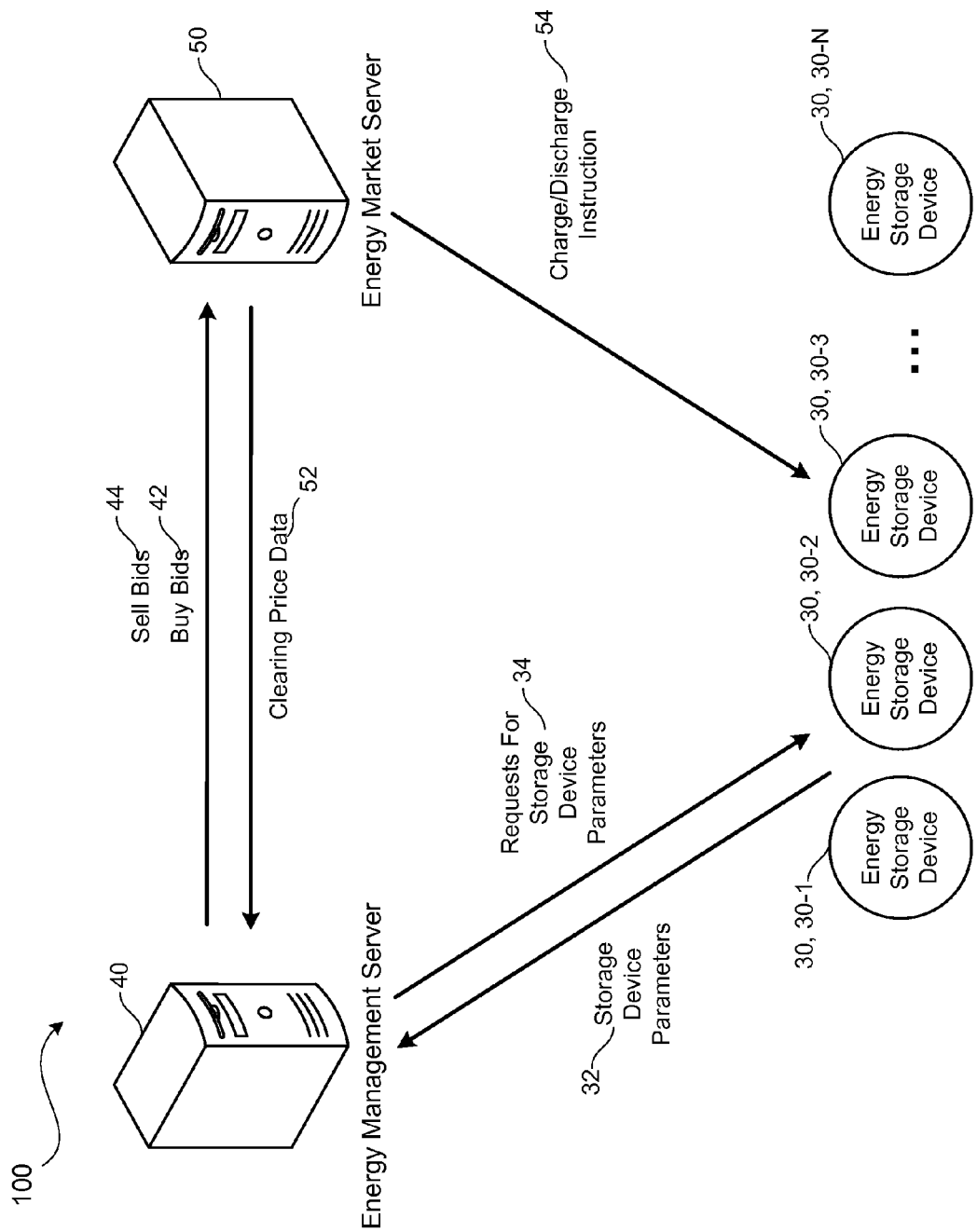
FIG. 2 is a schematic illustrating an example system for managing one or more energy storage devices in a wholesale energy market.

FIG. 2 illustrates an exemplary system 100 for managing one or more energy storage devices 30 in a wholesale energy market. In the illustrated example, the system 100 includes one or more energy storage devices 30, e.g., energy storage device 30-1, 30-2, 30-3 . . . 30-N, an energy management server 40, and a wholesale energy market server 50 (or "energy market server"). The energy storage devices 30, the energy management server 40 and the energy market server 50 can communicate with one another, respectively, over any suitable communication network (not shown) or combination of communication networks.

In the illustrated example, the energy management server 40 determines bids to purchase (e.g., buy bid 42) and/or sell energy (e.g., sell bid 44) and sends the buy bids 42 and/or the sell bids 44 to the energy market server 50. A buy bid 42 may include a monetary amount at which the bid provider, e.g., asset owner, agrees to purchase a defined amount of energy, e.g. 5 MW. The buy bid 42 may also designate a time period during which the energy is to be received from the grid, e.g., Jan. 11, 2013 from 1:00 PM-2:00 PM. Put another way, the buy bid 42 may designate the time period when the energy storage device 30 is to be charged. A sell bid 44 may include a monetary amount at which the bid provider, e.g., asset owner, agrees to sell a defined amount of energy, e.g., 1 MW. A sell bid 44 may further designate a time period during which the energy is to be provided to the grid, e.g., Jan. 11, 2013 from 1:00 PM-2:00 PM. Put another way, the sell bid 44 may designate the time period when the energy storage device is to discharge.

Both a buy bid 42 and a sell bid 44 can be either "day-ahead" bids or "same-day" bids. A day-ahead bid is a bid to either purchase or sell energy on the day immediately following the bid. For example, if a day-ahead buy bid is provided and accepted by the energy market on a Monday, then the energy is provided to the bid provider on the following Tuesday at the agreed upon price during the agreed upon time period. A same-day bid is a bid to either purchase or sell energy on the day of the bid, i.e., the "current day." For example, if a same-day sell bid is provided and accepted by the energy market on a Monday, the energy is discharged back into the grid on that Monday at the agreed upon price during the agreed upon time period. Unless explicitly referred to as a same-day bid or a day-ahead bid, reference to a "bid" can refer to either type of bid or any other suitable type of bid to purchase or sell energy.

The energy management server 40 receives data from the distributed energy storage devices 30, the energy market server 50, and/or external data sources (not shown) to determine the monetary amount of the bid and whether to provide the determined bids to the energy market server 50. In some embodiments, the energy management server 40 receives clearing price data 52 from the energy market server 50. Clearing price data 52 includes historical day-ahead clearing price data, historical same-day clearing price data, and/or real-time, same-day clearing price data. The term "clearing price" refers to an accepted price of a fixed amount of energy that is to be delivered at a particular time and at a particular location, such that the price was accepted on the energy wholesale market. "Real-time" or "current" clearing price data refers to the clearing prices of energy on the current date. Historical clearing price data can refer to clearing prices for energy on a specified previous date. For example, the wholesale energy market may determine a clearing price for 1 MW to be delivered in New York City, on Jan. 11, 2013 from 4:00 AM to 5:00 AM for $25.00. The clearing price is set by the energy wholesale market and is a function of the available supply and demand of energy. The wholesale energy market can determine the clearing price of energy in any suitable manner. The clearing price data 52 can indicate a time period and a location corresponding to the clearing price. For example, an instance of clearing price data 52 can be an ordered triple, e.g., (price, time, location).

The energy management server 40 is further configured to receive storage device parameters 32 from each of the energy storage devices 30 (e.g., batteries). The storage device parameters 32 can include, but are not limited to, current capacity of the energy storage device 30, total capacity of the energy storage device 30, operational efficiency of the energy storage device 30, a current operational state of the energy storage device 30, a charge rate of the energy storage device 30, and a discharge rate of the energy storage device 30. The current capacity of the energy storage device 30 can indicate the amount of energy that the energy storage device 30 is currently storing. The total capacity of the energy storage device 30 can indicate the amount of energy that the energy storage device 30 is capable of storing at a given time. The operational efficiency of the energy storage device 30 can indicate an expected percentage of energy loss when energy is taken from or provided back to the grid from the energy storage device 30. The current operational state of the energy storage device 30 can indicate whether the energy storage device 30 is currently operating in charge mode, discharge mode, or idle mode. The charge rate of the energy storage device 30 can indicate the amount of energy that the energy storage device 30 can receive per unit of time. The discharge rate of the energy storage device 30 can indicate the amount of energy that the energy storage device 30 can output per unit of time. The energy management server 40 can provide requests 34 for storage device parameters to the energy storage device 30, which in turn provides one or more of the storage device parameters 32 to the energy management server 40.

The energy management server 40 may further receive additional data from external sources. For example, the energy management server 40 can receive weather forecasts from, for example, a weather forecasting entity. The energy management server 40 may receive additional types of data from the external sources. The energy management server 40 can use the additional data to adjust buy and sell bids. For instance, when the forecasted weather suggests that energy demands will increase, e.g., colder in the winter and hotter in the summer, the energy management server 40 may adjust the buy and sell bids accordingly.

The energy management server 40 uses the received data to determine buy bids 42 and sell bids 44. The energy management server 40 may also determine whether entering a buy bid 42 or sell bid 44 is appropriate (e.g., whether current capacity of the energy storage device 30 is above a maximum threshold or below a minimum threshold). If so, the energy management server 40 transmits the buy bid 42 and/or the sell bid 44 to the energy market server 50. If a bid sent to the energy market server 50 is accepted by the energy wholesale market, the energy market server 50 transmits an instruction 54 to the energy storage device 30 to enter into either charge mode or discharge mode for a prescribed period. For example, if a sell bid 44 to sell 1 MW of energy from 4:00 AM to 5:00 AM on Mar. 9, 2012 from energy storage device 30-3 is accepted, the energy market server 50 transmits an instruction 54 to the energy storage device 30-3, instructing the energy storage device 30-3 to enter discharge mode at 4:00 AM on Mar. 9, 2012. An energy storage device 30 is configured to change its operational state according to the instructions 54 received from the energy market server 50. Once the energy storage device 30 has delivered the prescribed amount of energy, the energy storage device 30 can enter the idle mode, provided it is not scheduled to charge or discharge immediately afterwards.

Figure 3:
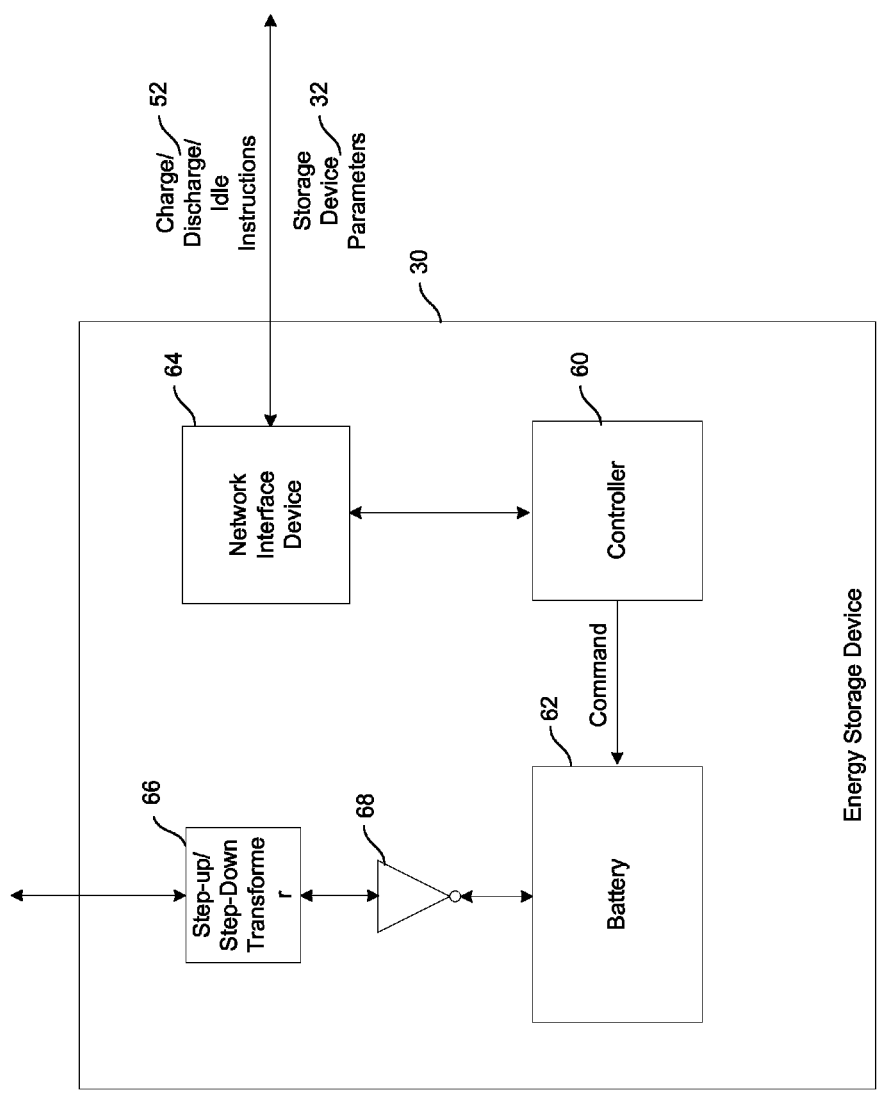
FIG. 3 is a schematic illustrating example components of an energy storage device.

FIG. 3 illustrates example components of an energy storage device 30. The energy storage device 30 can include a controller 60, a battery 62, and a network interface device 64. The energy storage device 30 can be owned, leased, or operated by a generator, utility, private party, or other similar entity. As discussed above, the energy storage device 30 receives energy from the grid when operating in a charge mode and discharges energy into the grid when operating in a discharge mode.

The battery 62 can be any suitable battery capable of storing energy. While one battery 62 is shown, the term "battery" can include one or more batteries arranged individually, in series, or in parallel. Example types of batteries include lead acid, sodium nickel, lithium ion batteries, and metal air batteries (e.g., Zn-air batteries) such as those described in PCT application publication nos. WO2012/012558 and WO2012/021550, the contents of which are hereby incorporated by reference.

In some implementations, the energy storage device 30 can include a step-up/step-down transformer 66 and a DC-AC/AC-DC inverter 68. When the energy storage device 30 is operating in a charge mode, the energy storage device 30 receives an alternating current from the grid. The transformer 66 steps the voltage of the incoming alternating current down to a suitable voltage and the inverter 68 inverts the stepped-down alternating current to a direct current. The energy supplied in the direct current can be stored in the battery 62. When the energy storage device 30 is operating in a discharge mode, the battery 62 can output a direct current, which the inverter 68 inverts into an alternating current. The step-up/ step-down transformer 66 steps-up the voltage of the alternating current to a suitable output alternating current, which is provided to the grid.

The controller 60 controls and monitors the operation of the battery 62. In some implementations, the controller 60 receives an instruction 52 from an energy market server 50 to charge or discharge the battery 62 at a prescribed time. The controller 60 can maintain a schedule defining when the battery 62 is to operate in a charge mode and when the battery 62 is to operate in a discharge mode. The controller 60 can update the schedule based on the received instructions. When the battery 62 is scheduled to charge, the controller 60 can command the battery 62 to begin charging. When the prescribed charging period ends, the controller 60 can command the battery 62 to stop charging. When the battery 62 is scheduled to discharge, the controller 60 can command the battery 62 to begin discharging. When the prescribed discharging period ends, the controller 60 can command the battery 62 to stop discharging.

Furthermore, the controller 60 can report the storage device parameters 32 of the energy storage device 30 to the energy management server 40 via the network interface device 64. The controller 60 can receive a request from the energy management server 40 for one or more storage device parameters 32. Some of these parameters, e.g., total capacity, charge rate, discharge rate, and operational efficiency, may be fixed or changing values that are stored in a memory device (not shown) of the energy storage device 30. The controller 60 can monitor and report other storage device parameters 32, such as the current capacity and the current operational state of the energy storage device 30. The controller 60 can determine the current capacity of the energy storage device 30 by, for example, monitoring the amount of charge stored in the battery 62. The controller 60 can determine the current operational state of the energy storage device 30 by, for example, referencing the schedule of the energy storage device 30.

The network interface device 64 can include one or more suitable devices for transmitting and receiving data packets to/from a communication network. The network interface device 64 can perform wireless or wired communication using any known or later developed communication standards.

The foregoing implementation of the energy storage device 30 is provided for example only. Any other suitable energy storage device 30 can be substituted for the energy storage device 30 described above without departing from the scope of the disclosure.

Figure 4:
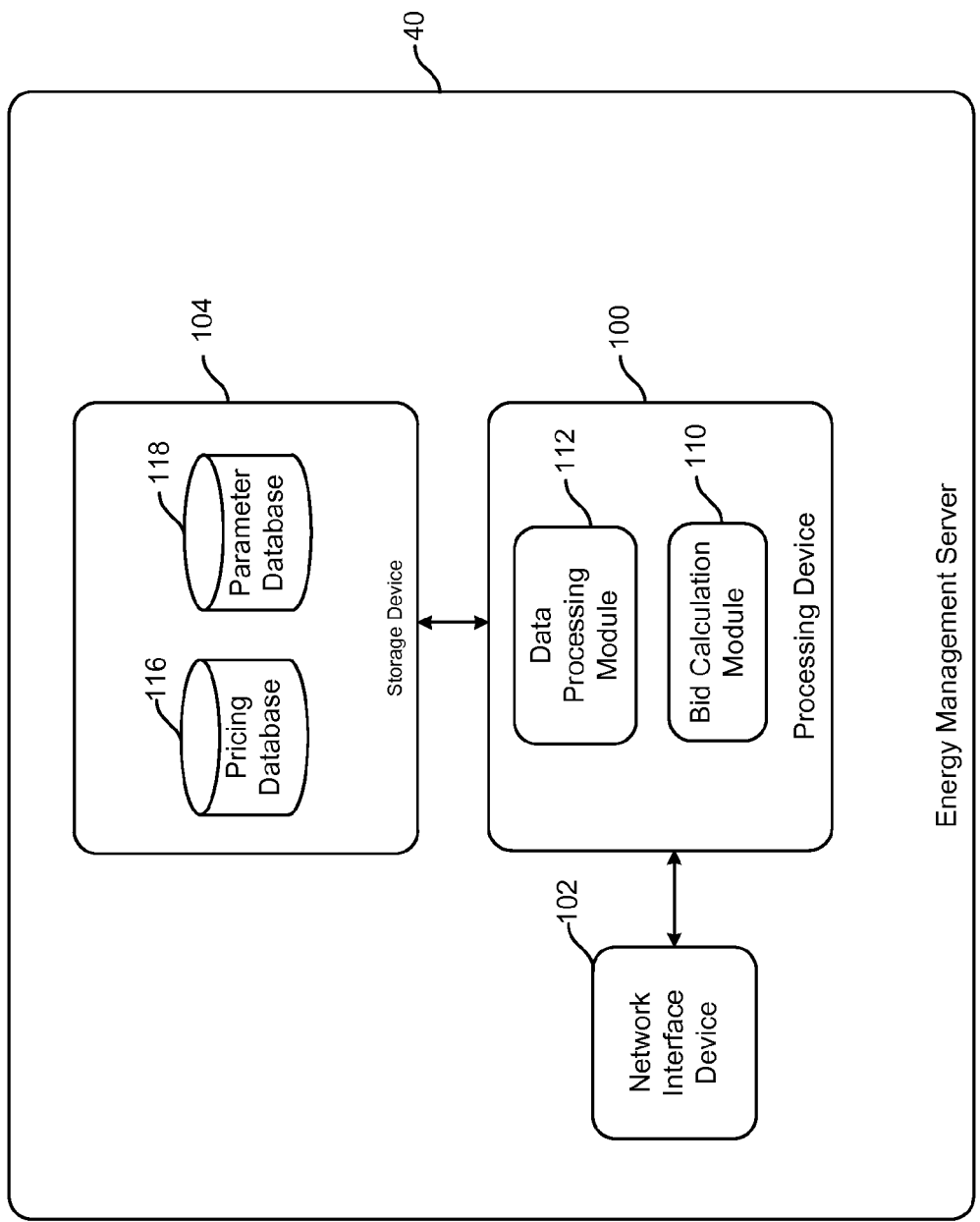
FIG. 4 is a schematic illustrating example components of an energy management server.

FIG. 4 illustrates an example energy management server 40. In the illustrated example, the energy management server 40 includes a processing device 100, a storage device 104, and a network interface device 102. The energy management server 40 may include additional components not shown in FIG. 4.

The processing device 100 includes one or more processors and computer-readable memory (e.g., random access memory and/or read only memory) storing computer-readable instructions that are executed by the one or more processors. In implementations where the processing device 100 includes two or more processors, the processors can execute in a distributed or individual manner. The processing device 100 can execute a bid calculation module 110 and a data processing module 112.

The network interface device 102 includes one or more suitable devices configured to send and receive data via a communication network. The network interface 102 can perform wireless or wired communication using any known or later developed communication standards. The network interface device 102 can, for example, receive historical clearing price data and real-time clearing price data from the energy market server 50 and the storage device parameters from the energy storage devices 30. The network interface device 102 can route the received data to the processing device 100.

The storage device 104 can include one or more storage mediums. Examples of storage mediums can include, but are not limited to, hard disk drives, optical disk drives, and magnetic disk drives. In the illustrated example, the storage device 104 stores a pricing database 116 and a parameter database 118.

The pricing database 116 stores historical clearing price data and is updated with newly received historical clearing price data and/or real-time clearing price data by the data processing module 112. As can be appreciated, real-time clearing price data can be considered "historical" once it has been stored, as it represents a clearing price for energy that occurred in the past. The data processing module 112 can receive historical clearing price data and/or real-time clearing price data from the energy market server 50 (FIG. 2) or another source. Based on the received clearing price data, the data processing module 112 can generate a database record and store the database record in the pricing database 116. A database record corresponding to a particular historical clearing price data point can include the clearing price of the energy, an indicator (e.g., flag) indicating whether the clearing price data is a day-ahead price or a same-day price, the date and time for which the price was valid, and the location for which the price was valid. Additional information that can be included in a database record includes a marginal cost of congestion and a marginal cost of losses. In some implementations, the data processing module 112 can normalize each clearing price. The data processing module 112 can generate the database records and update the pricing database 116 in any other suitable manner. The data processing module 112 can be implemented as computer-readable instructions that can be executed by the processing device 100.

The parameter database 118 stores storage device parameters 32 corresponding to each of the energy storage devices 30. For each energy storage device 30, the parameter database 118 can store a current capacity of the energy storage device 30, a total capacity of the energy storage device 30, an operational efficiency of the energy storage device 30, a current operational state of the energy storage device 30, a charge rate of the energy storage device 30, and a discharge rate of the energy storage device 30. The parameter database 118 can further store additional values for an energy storage device 30 that are derived from the energy storage parameters 32. For instance, the parameter database 118 can store upper and lower quantile index values for each of the energy storage devices 30 (which are described in further detail below).

The bid calculation module 110 calculates bids for buying (i.e., buy bids 42) and/or selling (i.e., sell bids 44) energy and, if appropriate, transmits the bids to the energy market server 50. The bid calculation module 110 can be implemented as computer-readable instructions that can be executed by the processing device 100.

The bid calculation module 110 can calculate bids for one or more of the energy storage devices 30. For each energy storage device 30, the bid calculation module 110 can calculate buy bids 42 and/or sell bids 44 based on the data contained within the pricing database 116, the clearing price data 52, and the energy storage parameters 32 of the energy storage device 30. The bid calculation module 110 can analyze the pricing database data 116 and the clearing-price data 52, e.g., day-ahead clearing price data and/or same-day clearing price data, to determine appropriate bids for selling and/or buying energy. In some implementations, the bid calculation module 110 may utilize current and historical clearing price data to determine the buy bids 42 and sell bids 44.

In some implementations, the bid calculation module 110 determines whether it is appropriate to transmit buy bids 42 or sell bids 44 based on energy storage parameters 32 received from the energy storage device 30. For example, if the current capacity of the battery 62 is full or nearly full, then the bid calculation module 110 determines that generating and/or transmitting buy bids 42 is not currently feasible. Likewise, if the capacity of the battery 62 is below a minimum threshold, e.g., the battery 62 is less than 15% charged, then the bid calculation module 110 determines that generating and/or transmitting sell bids 44 is not feasible.

Figure 5:
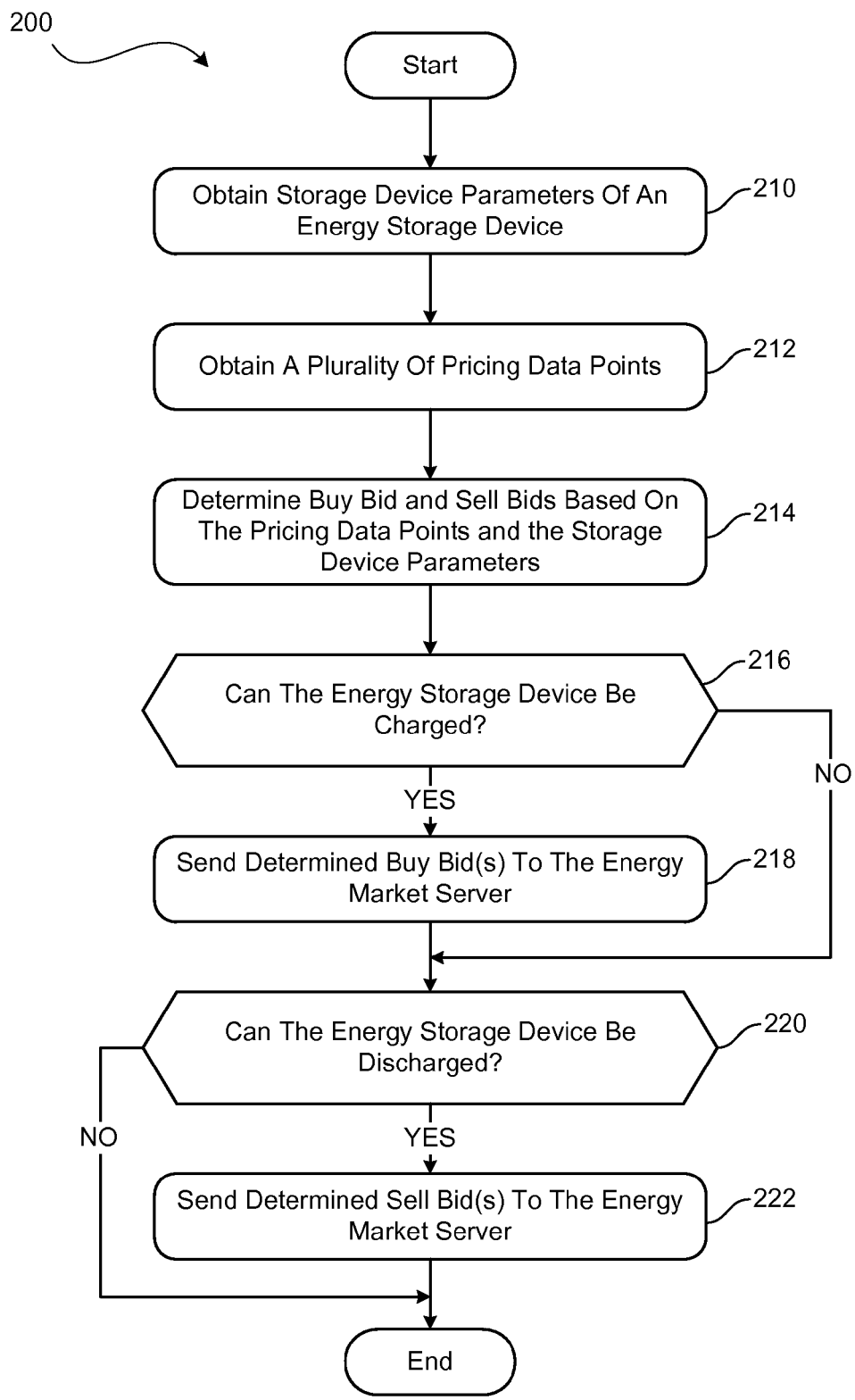
FIG. 5 is a flow diagram illustrating an example set of operations for a method for managing the charging and discharging of an energy storage asset.

FIG. 5 illustrates an example set of operations for a high-level method 200 for generating and transmitting buy bids 42 and/or sell bids 44. In some implementations, the method 200 can be executed by the bid calculation module 110. The method 200 may be executed for one or more energy storage devices 30. For purposes of explanation, the method 200 is described as being performed for a single energy storage device 30.

At operation 210, the bid calculation module 110 obtains storage device parameters 32. The bid calculation module 110 can obtain the storage device parameters 32 from the energy storage device 30 and/or the storage device database 118. For example, the bid calculation module 110 can obtain the current capacity of the energy storage device 30. Further, the bid calculation module 110 can obtain the total capacity of the energy storage device 30, the charge rate of the energy storage device 30, and the discharge rate of the energy storage device 30. As will be discussed in further detail below, the total capacity, the charge rate, and the discharge rate of the energy storage device 30 are used to determine sell bids 44 and buy bids 42.

At operation 212, the bid calculation module 110 obtains a plurality of clearing price data points. The clearing price data points can be real-time clearing price data points and/or historical clearing price data points. Furthermore, each clearing price data point may represent a day-ahead clearing price or a same-day clearing price. The clearing price data points may be obtained from the pricing database 116 and/or from the energy market server 50, or any combination thereof.

Figure 6:
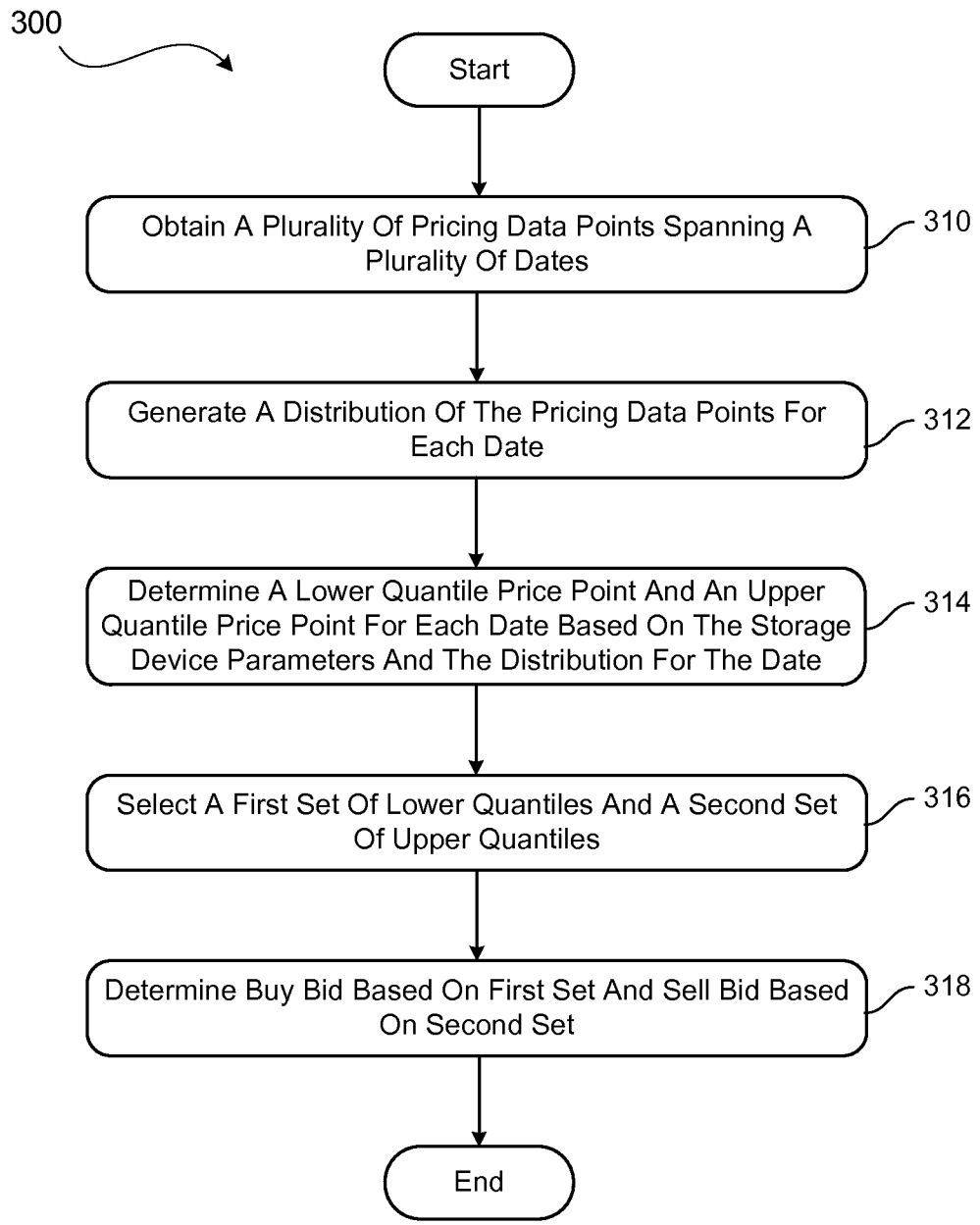
FIG. 6 is a flow diagram illustrating an example set of operations for a method for determining buy and sell bids.

At operation 214, the bid calculation module 110 determines one or more sell bids 44 and one or more buy bids 42. The determined bids can be same-day bids or day-ahead bids. In some implementations, the bid calculation module 110 calculates buy bids 42 based on the pricing database data 116, clearing price data 52, the total capacity of the energy storage device 30, and the charge rate of the energy storage device 30. The bid calculation module 110 calculates the sell bids 44 based on the pricing database data 116, the clearing price data 52, the total capacity of the energy storage device 30, and the discharge rate of the energy device 30. FIGS. 6 and 7 illustrate example techniques for calculating the buy bids 42 and sell bids 44.

At operation 216, the bid calculation module 110 determines whether the energy storage device 30 can be charged. In some implementations, the bid calculation module 110 determines whether the current capacity of the energy storage device 30 is at or above a maximum threshold. The bid calculation module 110 can compare the current capacity of the energy storage device 30 to the maximum threshold. The maximum threshold may be 100% or may be a lesser value, e.g., 95%. It is noted that if the bid calculation module 110 has calculated buy bids 42, the bid calculation module 110 can determine an expected net change in the current capacity based on how much energy is scheduled to be discharged and charged in the period between when the bid calculation module 110 determines the buy bid 42 and when the energy is to be received/delivered. The bid calculation module 110 can adjust the current capacity by the expected net change. If the current capacity (including an adjusted current capacity) is below the maximum threshold, the bid calculation module 110 transmits the determined buy bid 42 to the energy market server 50, as shown at operation 218.

At operation 220, the bid calculation module 110 determines whether the energy storage device 30 can be discharged. In some implementations, the bid calculation module 110 determines whether the current capacity of the energy storage device 30 is at or below a minimum threshold. The bid calculation module 110 can compare the current capacity of the energy storage device 30 to the minimum threshold. The minimum threshold may be 0%, 5%, 10%, 15%, 20% or greater value, e.g., 25%. It is noted that if the bid calculation module 110 has calculated sell bids, the bid calculation module 110 can determine an expected net change in the current capacity based on how much energy is scheduled to be discharged and charged in the period between when the bid calculation module 110 determines the sell bid and when the energy is to be received/delivered. The bid calculation module 110 can adjust the current capacity by the expected net change. If the current capacity (including an adjusted current capacity) is greater than the minimum threshold, the bid calculation module 110 transmits the determined sell bid 44 to the energy market server 50, as shown at operation 222.

The method 200 is provided for example only and is not intended to be limiting. The ordering of the operations described above can be varied without departing from the scope of the disclosure. Not all of the operations described above are required and additional or alternative operations are also within the scope of the disclosure.

FIG. 6 illustrates an example set of operations for a method 300 for determining buy bids 42 and sell bids 44. The method 300 may be executed by the bid calculation module 110. The method 300 can be applied to determine buy bids and sell bids for one or more storage devices 30. For purposes of explanation, however, the method 300 is explained as being performed for a single storage device 30.

At operation 310, the bid calculation module 110 obtains a plurality of clearing price data points spanning a plurality of dates. In some implementation, the bid calculation module 110 obtains clearing price data points spanning the current month. For example, if same-day bids are being determined for a date in January, the bid calculation module 110 can retrieve the historical same-day clearing price data points for all of the dates in the current January. Additionally or alternatively, the bid calculation module 110 can retrieve clearing price data points corresponding to the previous M days, where M is an integer greater than 0. For example, the bid calculation module 110 can retrieve the historical same-day clearing price data points for the previous thirty days. Additionally or alternatively, the bid calculation module 110 can retrieve clearing price data points corresponding to days of the same type as the date for which the buy bid 42 and sell bid 44 are being calculated, e.g., weekday or weekend/holiday. For example, if the day type for which bids are being produced is a weekday in January, the bid calculation module 110 can retrieve the historical same-day clearing price data points for all previous weekdays in January. In some implementations, the bid calculation module 110 obtains clearing price data points which correspond to a particular location. For instance, if an energy storage device 30 is located in Detroit, Mich., the bid calculation module 110 retrieves clearing price data points which define the clearing prices of energy in Detroit, Mich. Additionally or alternatively, the bid calculation module 110 can retrieve clearing price data points based on additional or alternate values as well.

At operation 312, the bid calculation module 110 generates a distribution of clearing prices for each date obtained at operation 310. As used herein, the term "distribution" can be any sorted or sortable data structure that lists the clearing price data points for a particular date or set of dates. An example of a distribution of clearing price data points corresponding to same-day clearing prices of energy sold in Detroit Mich., on Jan. 22, 2013 is provided: [$18.04, $18.52, $19.12, $19.37, $20.04, $20.07, $20.78, $21.09, $22.05, $22.15, $22.22, $23.54, $23.67, $24.00, $24.24, $25.10]. The foregoing example represents all of the same-day clearing prices in Detroit Mich. on Jan. 22, 2013. As can be appreciated, the same-day clearing prices range from $18.04 to $25.10. The bid calculation module 110 can generate the distributions in any suitable manner. In some implementations, the bid calculation module 110 can compile a list of clearing price data points for each day and can order the list based on the clearing prices.

At operation 314, the bid calculation module 110 determines a lower quantile price point and an upper quantile price point for each date, i.e., of each distribution. The term "quantile" can refer to a data point taken at a particular interval of a distribution. The distribution can be divided up into q substantially equally sized subsets. Thus, if q=4, the distribution is divided into four substantially equally sized subsets. The lower quantile (the lower quartile in this example) is the highest value of the subset at the lowest portion of the range (i.e., the $25^{th}$ percentile) and the upper quantile (the upper quartile in this example) is the lowest value of the subset at the highest portion of the range (i.e., the $75^{th}$ percentile). In the example distribution provided above, the lower quartile is $19.37 and the upper quartile is $23.67. In some implementations, upper and lower index values of an energy storage device 30 are used to determine the upper and lower quantiles. The index values refer to a fraction of a distribution. In some implementations, the lower index value (e.g., $Q_{LOW}$) and the upper index value (e.g., $Q_{HIGH}$) are calculated according to equations (1) and (2):

$$Q_{LOW} = \frac{\frac{Total\ Capacity}{Charge\ Rate}}{Time\ Division} \quad (1)$$

$$Q_{HIGH} = \frac{\frac{Total\ Capacity}{Discharge\ Rate}}{Time\ Division} \quad (2)$$

where Total Capacity is the total capacity of an energy storage device 30, Charge Rate is the charge rate of an energy storage device 30, Discharge Rate is the discharge rate of an energy storage device 30, and Time Division is the amount of time intervals in a day. The Time Division value is typically 24, as energy is typically sold in one hour divisions. Thus, if an energy storage device 30 has a total capacity of 6 MWh, a charge rate of 1 MW, and a discharge rate of 1 MW, the index value of the lower quantile, $Q_{LOW}$, is 0.25 and the index value of the upper quantile, $Q_{HIGH}$, is 0.75. It is noted that the $Q_{LOW}$ and $Q_{HIGH}$ values can be pre-calculated for each energy storage device 30 and stored in the parameter database 118. Furthermore, the $Q_{LOW}$ and $Q_{HIGH}$ values can be rounded to the nearest quantile. For example, if $Q_{LOW}$ is calculated to be 0.30, then the $Q_{LOW}$ value may be rounded to 0.33, such that the lower quantile is equivalent to the highest value in the bottom third of each distribution.

At operation 316, the bid calculation module 110 selects a first set of all lower quantile price points and a second set of all upper quantile price points that were determined at operation 314.

At operation 318, the bid calculation module 110 determines a buy bid 42 based on the first set of lower quantile price points and a sell bid 44 based on the second set of upper quantile price points. In some implementations, the bid calculation module 110 can determine the buy bid 42 by calculating an average value of the first set of lower quantile price points or by identifying the median value of the first set of lower quantile price points. Similarly, the bid calculation module 110 can determine the sell bid 44 by calculating the average value of the second set of upper quantile price points or by identifying the median value of the second set of upper quantile price points. In some implementations, the bid calculation module 110 may be configured to calculate weighted averages of the first and second set, such that the more recent values in each set are given a greater weight than the older values in the set.

Once the buy bid 42 and sell bid 44 have been calculated, the bid calculation module 110 can determine whether to send the buy bid 42 and/or sell bid 44 to the energy market server 50 (see e.g., FIG. 5, operations 216-222). As was discussed above, the determination as to whether to send a buy bid 42 or a sell bid 44 is based on the current capacity of the energy storage device 30, as well as any additional operating constraints.

The foregoing method 300 can be performed to calculate day-ahead bids and same-day bids alike. When the bid calculation module 110 is calculating day-ahead bids, the bid calculation module 110 can utilize historical day-ahead clearing price data points to calculate the day-ahead bids. Similarly, when the bid calculation module 110 is calculating same-day bids, the bid calculation module 110 can utilize historical same-day clearing price data points to calculate the same-day bids. Variations of the method 300 are contemplated and are within the scope of the disclosure.

FIG. 7 illustrates an example set of operations for a method 400 for determining same-day buy bids 42 and same-day sell bids 44. In some implementations, the method 400 is executed by the bid calculation module 110. The method 400 can be applied to determine buy bids 42 and sell bids 44 for one or more energy storage devices 30. For purposes of explanation, however, the method 400 is explained as being performed for a single storage device 30.

At operation 410, the bid calculation module 110 obtains historical day-ahead clearing price data points spanning a plurality of dates. Each historical day-ahead clearing price data point can define a previous day-ahead clearing price for energy that was accepted on a specific date. The historical day-ahead clearing price data points can correspond to a current month or can span a predetermined amount of previous days, e.g., the previous thirty days. Additionally or alternatively, the bid calculation module 110 can retrieve historical day-ahead price points based on the type of day for which buy bids 42 and sell bids 44 are being produced, e.g., weekdays or weekends/holidays. For example, if the current day for which bids are being produced is a weekend in November, the bid calculation module 110 can retrieve historical day-ahead clearing price points which correspond to all weekends in November. In some implementations, the bid calculation module 110 obtains historical day-ahead clearing price data points that correspond to a particular location, e.g., Southwest Ohio or Los Angeles, Calif.

At operation 412, the bid calculation module 110 determines an indicative historical day-ahead buy price and an indicative historical day-ahead sell price based on the historical day-ahead clearing price data points and the storage device parameters of the energy storage device 30 for which the bids are being calculated. In some implementations, the bid calculation module 110 determines a distribution of the historical day-ahead clearing price data for each date represented in the set of data points obtained at operation 410. For each distribution, the bid calculation module 110 can determine an upper quantile price point and a lower quantile price point of the distribution. As previously discussed, the index of the lower quantile price point can be determined based on the total capacity of the energy storage device 30, the charge rate of the energy storage device 30, and the amount of time divisions in the day. For example, equation (1) is an example equation for determining the index value of the lower quantile price point. Similarly, the index of the upper quantile price point can be determined based on the total capacity of the energy storage device 30, the discharge rate of the energy storage device 30, and the amount of time divisions in the day. For example, equation (2) is an example equation for determining the index value of the upper quantile price point.

In some implementations, the bid calculation module 110 can determine the indicative historical day-ahead buy price by determining the average lower quantile price point value from the set of all lower quantile price points. Additionally or alternatively, the bid calculation module 110 can determine the indicative historical day-ahead buy price by identifying a median lower quantile price point value from the set of all lower quantile price points. Similarly, the bid calculation module 110 can determine the indicative historical day-ahead sell price by determining an average upper quantile price point value from the set of all upper quantile price points or by identifying the median upper quantile price point value from the set of all upper quantile price points.

At operation 414, the bid calculation module 110 obtains a plurality of current day-ahead clearing price data points corresponding to the day prior to the current day. Each current day-ahead clearing price data point can indicate a day-ahead clearing price for energy, such that the purchased energy is/was to be delivered on the current day. The current day-ahead clearing price data points can be received from the energy market server 50 or can be stored in the pricing database 116.

At operation 416, the bid calculation module 110 determines an indicative current day-ahead buy price and an indicative current day-ahead sell price based on the plurality of current day-ahead clearing price data points. In some implementations, the bid calculation module 110 generates a distribution of the current day-ahead clearing price data points and determines the lower and upper quantile price points of the distribution. The lower quantile price point of the distribution is the indicative current day-ahead buy price and the upper quantile price point is the indicative current day-ahead sell price. In some implementations, the index of the lower quantile price point can be determined according to equation (1) and the index of the upper quantile price point can be determined according to equation (2).

At operation 418, the bid calculation module 110 determines a buy delta ratio and a sell delta ratio. The buy delta ratio is based on the indicative historical day-ahead buy price and the indicative current day-ahead buy price. In some implementations, the buy delta ratio, $\Delta_{BUY}$, can be calculated according to equation (3):

$$\Delta_{BUY} = \frac{\text{Current Day Ahead Buy Price}}{\text{Historical Day Ahead Buy Price}} \quad (3)$$

where "Current Day Ahead Buy Price" is the indicative current day-ahead buy price and "Historical Day Ahead Buy Price" is the indicative historical day-ahead buy price. Similarly, the sell delta ratio is based on the indicative historical day-ahead sell price and the indicative current day-ahead sell price. In some implementations, the sell delta ratio, $\Delta_{SELL}$, can be calculated according to equation (4):

$$\Delta_{SELL} = \frac{\text{Current Day Ahead Sell Price}}{\text{Historical Day Ahead Sell Price}} \quad (4)$$

where "Current Day Ahead Sell Price" is the indicative current day-ahead sell price and "Historical Day Ahead Buy Price" is the indicative historical day-ahead sell price. It is noted that the buy delta ratio and the sell delta ratio may be calculated in any other suitable manner without departing from the scope of the disclosure.

At operation 420, the bid calculation module 110 obtains a plurality of historical same-day clearing price data points spanning a plurality of dates. Each historical same-day clearing price can indicate a clearing price for energy that was sold and delivered on the same day. The historical same-day clearing price data points can span the current month or a predetermined amount of previous days, e.g., the previous thirty days. Additionally or alternatively, the bid calculation module 110 can retrieve historical same-day clearing price data points based on the type of date to which the current day belongs, e.g., if bids are being calculated for a Wednesday, the bid calculation module 110 can retrieve historical same-day clearing price points for all Wednesdays in the historical same-day clearing price dataset.

At operation 422, the bid calculation module 110 determines a buy bid 42 and a sell bid 44 based on the historical same-day clearing price data points and the storage device parameters of the energy storage device 30. In some implementations, the bid calculation module 110 generates a distribution of same-day clearing price data points for each of the dates. For each distribution, the bid calculation module 110 can identify the lower and upper quantile price points of the distribution. In some implementations, the index of the lower quantile price point can be determined according to equation (1) and the index of the upper quantile price point can be determined according to equation (2).

As was discussed above, the bid calculation module 110 can determine an average lower quantile price point value from all lower quantile price points or a median lower quantile price point value from all lower quantile price points to determine the buy bid 42. Similarly, the bid calculation module 110 can determine an average upper quantile price point value from all upper quantile price points or a median upper quantile price point value from all upper quantile price points to determine the sell bid 44.

At operation 424, the bid calculation module 110 adjusts the buy bid 42 and the sell bid 44 based on the buy delta ratio and the sell delta ratio, respectively. In some implementations, the bid calculation module 110 adjusts the buy bid 42 by multiplying the buy bid 42 by the buy delta ratio. Similarly, the bid calculation module 110 can adjust the sell bid 44 by multiplying the sell bid 44 by the sell delta ratio. By adjusting the buy bid 42 and sell bid 44 with the respective delta ratios, the bid calculation module 110 takes into account the way the wholesale energy market is currently behaving in view of the historical and current day-ahead clearing price data. For example, if the temperatures in January have been unseasonably cold, the indicative current day-ahead buy price (determined at operation 416) may be higher than the indicative historical day-ahead buy price for the month. Accordingly, the buy delta ratio is greater than one, and the bid calculation module 110 increases the determined buy bid 42 to compensate for the increasing energy prices.

Once the buy bid 42 and sell bid 44 are calculated, the bid calculation module 110 can determine whether to send the buy bid 42 and/or sell bid 44 to the energy market server 50. As was discussed above, the determination as to whether to send a buy bid 42 or a sell bid 44 is based on the current capacity of the energy storage device 30 as well as any additional operational constraints.

The foregoing method 400 can be performed to calculate day-ahead bids and same-day bids alike. Variations of the method 400 are contemplated and are within the scope of the disclosure.

It is noted that the bid calculation module 110 can determine buy bids 42 and sell bids 44 using the techniques described with respect to FIG. 6 or FIG. 7. Furthermore, the bid calculation module 110 may be configured to execute the methods of both FIGS. 6 and 7 to determine alternate buy bids 42 and sell bids 44. Moreover, the techniques described above can be modified to take into account additional factors, such as the current weather or predicted weather.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for managing the charging and/or discharging of an energy storage device, the method comprising:
   receiving, at a processing device, clearing price data from an energy market server associated with a wholesale energy market and in communication with the processing device and the energy storage device, the clearing price data including an accepted price of a fixed amount of energy for delivery at a particular time and at a particular location;
   receiving, at the processing device, storage device parameters from the energy storage device in communication with the processing device, the storage device parameters including a charge rate of the energy storage device, a discharge rate of the energy storage device, a total capacity of the energy storage device, and a current capacity of the energy storage device;
   obtaining, at the processing device, a plurality of clearing price data points from the received clearing price data that span a plurality of dates, each clearing price data point being indicative of a clearing price of a unit of energy on a certain date;
   for each date represented in the plurality of clearing price data points:
      generating, at the processing device, a distribution of the clearing price data points corresponding to the date;
      determining, at the processing device, a lower quantile price point of the distribution based on the total capacity of the energy storage device and the charge rate of the energy storage device; and
      determining, at the processing device, an upper quantile price point of the distribution based on the total capacity of the energy storage device and the discharge rate of the energy storage device;
   selecting, at the processing device, a first set of the lower quantile price points from the determined lower quantiles;
   selecting, at the processing device, a second set of the upper quantile price points from the determined upper quantiles;
   determining, at the processing device, a buy bid indicating an offered price for a purchase of energy at a first prescribed time based on the first set;
   determining, at the processing device, a sell bid indicating an offered price for a sale of energy at a second prescribed time based on the second set;

transmitting the buy bid to the energy market server when the current capacity of the energy storage device is less than a maximum threshold, wherein when the buy bid transmitted to the energy market server is accepted by the energy wholesale market, the energy market server transmitting a charge instruction to the energy storage device instructing the energy storage device to enter into a charge mode at the first prescribed time and charge the purchased energy for a prescribed charging period starting at the first prescribed time; and transmitting the sell bid to the energy market server when the current capacity of the energy storage device is greater than a minimum threshold, wherein when the sell bid transmitted to the energy market server is accepted by the energy wholesale market, the energy market server transmitting a discharge instruction to the energy storage device instructing the energy storage device to enter into a discharge mode at the second prescribed time and discharge the sold energy for a prescribed discharging period starting at the second prescribed time.

2. The method of claim 1, wherein the energy wholesale market determines clearing prices for energy.

3. The method of claim 1, wherein each clearing price data point is a day-ahead clearing price indicating a day-ahead clearing price of energy on a corresponding date; and the buy bid and sell bid are each day-ahead bids.

4. The method of claim 1, wherein each clearing price data point is a same-day clearing price indicating a same-day clearing price of energy on a corresponding date; and the buy bid and sell bid are each same-day bids.

5. The method of claim 1, wherein the selecting the first set of lower quantile price points includes:
for each lower quantile price point:
determining a type of day to which the lower quantile price point corresponds;
grouping the lower quantile price points into a specific group based on the type of day,
wherein the first set is comprised of lower quantile price points corresponding to the same type of day.

6. The method of claim 5, wherein the buy bid is determined by averaging the lower quantile price points of the first set.

7. The method of claim 1, wherein selecting the second set of upper quantile price points includes:
for each upper quantile price point:
determining a type of day to which the upper quantile price point corresponds;
grouping the upper quantile price points into a specific group based on the type of day,
wherein the second set is comprised of upper quantile price points corresponding to the same type of day.

8. The method of claim 7, wherein the sell bid is determined by averaging the upper quantile price points of the second set.

9. The method of claim 1, wherein determining the lower quantile price point of a distribution includes determining a lower quantile index based on the charge rate of the energy storage device, the total capacity of the energy storage device, and an amount of time divisions in a day, each time division representing an equal period during the day when energy is provided to a purchaser of the energy.

10. The method of claim 9, wherein the lower quantile index, $Q_{LOW}$, is determined according to:

$$Q_{LOW} = \frac{\frac{\text{Total Capacity}}{\text{Charge Rate}}}{\text{Time Division}}$$

where Total Capacity is the total capacity of an energy storage device, Charge Rate is the charge rate of the energy storage device and Time Division is the amount of time divisions in a day.

11. The method of claim 1, wherein determining the upper quantile price point of a distribution includes determining an upper quantile index based on the discharge rate of the energy storage device, the total capacity of the energy storage device, and an amount of time divisions in a day, each time division representing an equal period during the day when energy is sold.

12. The method of claim 11, wherein the upper index value, $Q_{HIGH}$, is determined according to:

$$Q_{HIGH} = \frac{\frac{\text{Total Capacity}}{\text{Discharge Rate}}}{\text{Time Division}}$$

where Total Capacity is the total capacity of an energy storage device, Discharge Rate is the discharge rate of the energy storage device and Time Division is the amount of time divisions in a day.

13. An energy market server for managing the charging and/or discharging of an energy storage device, the server comprising:
a network interface device;
a storage device; and
a processing device configured to:
receive clearing price data from the energy market server associated with a wholesale energy market and in communication with the processing device and the energy storage device, the clearing price data including an accepted price of a fixed amount of energy for delivery at a particular time and at a particular location;
receive energy storage device parameters from the energy storage device in communication with the processing device, the energy storage device parameters including a charge rate of the energy storage device, a discharge rate of the energy storage device, a total capacity of the energy storage device, and a current capacity of the energy storage device;
obtain a plurality of clearing price data points from the received clearing price data that span a plurality of dates, each clearing price data point being indicative of a clearing price of a unit of energy on a certain date;
for each date represented in the plurality of clearing price data points:
generate distribution of the clearing price data points corresponding to the date;
determine a lower quantile price point of the distribution based on the total capacity of the energy storage device and the charge rate of the energy storage device; and
determine an upper quantile price point of the distribution based on the total capacity of the energy storage device and the discharge rate of the energy storage device;
select a first set of the lower quantile price points from the determined lower quantiles;

select a second set of the upper quantile price points from the determined upper quantiles;

determine a buy bid indicating an offered price for a purchase of energy at a first prescribed time based on the first set;

determine a sell bid indicating an offered price for a sale of energy at a second prescribed time based on the second set;

transmit the buy bid to the energy market server when the current capacity of the energy storage device is less than a maximum threshold, wherein when the buy bid transmitted to the energy market server is accepted by the energy wholesale market, the energy market server transmitting a charge instruction to the energy storage device instructing the energy storage device to enter into a charge mode at the first prescribed time and charge the purchased energy for a prescribed charging period starting at the first prescribed time; and transmit the sell bid to the energy market server when the current capacity of the energy storage device is greater than a minimum threshold, wherein when the sell bid transmitted to the energy market server is accepted by the energy wholesale market, the energy market server transmitting a discharge instruction to the energy storage device instructing the energy storage device to enter into a discharge mode at the second prescribed time and discharge the sold energy for a prescribed discharging period starting at the second prescribed time.

14. The server of claim 13, wherein the energy wholesale market determines clearing prices for energy.

15. The server of claim 13, wherein each clearing price data point is a day-ahead clearing price indicating a day-ahead clearing price of energy on a corresponding date; and the buy bid and sell bid are each day-ahead bids.

16. The server of claim 13, wherein each clearing price data point is a same-day clearing price indicating a same-day clearing price of energy on a corresponding date; and the buy bid and sell bid are each same-day bids.

17. The server of claim 13, wherein the processing device selects the first set of lower quantile price points by:
for each lower quantile price point:
determining a type of day to which the lower quantile price point corresponds; and
grouping the lower quantile price points into a specific group based on the type of day,
wherein the first set is comprised of lower quantile price points corresponding to the same type of day.

18. The server of claim 17, wherein the buy bid is determined by averaging the lower quantile price points of the first set.

19. The server of claim 13, wherein the processing device selects the second set of upper quantile price points by:
for each upper quantile price point:
determining a type of day to which the upper quantile price point corresponds; and
grouping the upper quantile price points into a specific group based on the type of day,
wherein the second set is comprised of upper quantile price points corresponding to the same type of day.

20. The server of claim 19, wherein the sell bid is determined by averaging the upper quantile price points of the second set.

21. The server of claim 13, wherein the processing device determines the lower quantile price point of a distribution by determining a lower quantile index based on the charge rate of the energy storage device, the total capacity of the energy storage device, and an amount of time divisions in a day, each time division representing an equal period during the day when energy is provided to a purchaser of the energy.

22. The server of claim 21, wherein the lower quantile index, $Q_{LOW}$, is determined according to:

$$Q_{LOW} = \frac{\frac{\text{Total Capacity}}{\text{Charge Rate}}}{\text{Time Division}}$$

where Total Capacity is the total capacity of an energy storage device, Charge Rate is the charge rate of the energy storage device and Time Division is the amount of time divisions in a day.

23. The server of claim 13, wherein the processing device determines the upper quantile price point of a distribution by determining an upper quantile index based on the discharge rate of the energy storage device, the total capacity of the energy storage device, and an amount of time divisions in a day, each time division representing an equal period during the day when energy is sold.

24. The server of claim 23, wherein the upper index value, $Q_{HIGH}$, is determined according to:

$$Q_{HIGH} = \frac{\frac{\text{Total Capacity}}{\text{Discharge Rate}}}{\text{Time Division}}$$

where Total Capacity is the total capacity of an energy storage device, Discharge Rate is the discharge rate of the energy storage device and Time Division is the amount of time divisions in a day.

* * * * *